United States Patent [19]

Petersen

[11] Patent Number: 4,660,664
[45] Date of Patent: Apr. 28, 1987

[54] WEIGHING PAN AND A COMBINATION WEIGHING MACHINE EQUIPPED WITH SUCH PANS

[76] Inventor: Gunnar C. Petersen, No. 14, Rodkildevaenget, 5230 Odense M, Denmark

[21] Appl. No.: 785,611

[22] Filed: Oct. 8, 1985

[30] Foreign Application Priority Data

Oct. 16, 1984 [DK] Denmark .............................. 4945/84

[51] Int. Cl.$^4$ ..................... G01G 13/16; G01G 13/14; B65D 47/00
[52] U.S. Cl. .................................. 177/108; 177/165; 222/503
[58] Field of Search ............... 177/108, 109, 110, 112, 177/113, 165; 222/503, 508

[56] References Cited

U.S. PATENT DOCUMENTS

| 490,710 | 1/1893 | Hartley | 177/112 |
|---|---|---|---|
| 3,145,057 | 8/1964 | Taggart | 222/503 X |
| 3,599,844 | 8/1971 | Dickson | 177/112 X |
| 4,393,950 | 7/1983 | Klopfenstein et al. | 177/165 X |
| 4,545,446 | 10/1985 | Kokabu | 177/108 |

Primary Examiner—George H. Miller, Jr.
Attorney, Agent, or Firm—Stevens, Davis, Miller & Mosher

[57] ABSTRACT

The weighing pan comprises a pair of opposed sidewalls and at least one pivotable closure flap which is coupled to one sidewall in such a way that the pivoting movement of the closure flap between closed and open position is accompanied by a displacement of the associated sidewall relative to the opposite sidewall. Articles, which might have got jammed between the sidewalls, are likely to be released in response to the relative movement of the sidewalls and drop out through the open bottom of the pan. A combination weighing machine including a plurality of weighing pans and means for reopening a pan, if necessary in order to ensure complete emptying thereof, is also disclosed.

6 Claims, 7 Drawing Figures

WEIGHING PAN AND A COMBINATION WEIGHING MACHINE EQUIPPED WITH SUCH PANS

BACKGROUND OF THE INVENTION

This invention relates to a weighing pan for weighing-out articles to be packaged batchwise, especially but not exclusively for use in combination weighing of irregularly shaped articles, and comprising a pair of opposed sidewalls and at least one pivotable closure flap for controlling an article discharge opening defined between the sidewalls.

Combination weighing has proved to be well-suited for the metering of ready-for-sale batches or portions of many different commodities, including potatoes and other vegetables, when it is desired that the weight of the individual batches or portions shall deviate as little as possible from a prescribed nominal weight. In the interest of the consumers the nominal weight is often a minimum weight. Especially in the case of articles, such as potatoes, which exhibit a relatively large scatter in the weight of the individual articles, the attainable accuracy, which in practice can be expressed as the percentual difference between the average value of a suitable number of successively weighed-out portions (e.g. 20 to 30 portions) and said nominal weight, increases rather fast with the number of weighing pans in the weighing machine employed because with more weighing pans there are more combinations of subportions of correspondingly different weights to choose from.

Computer-controlled combination weighing has been known in the art for several years and detailed description of various embodiments of the method can be found, inter alia, in several patent specifications. In the present context it should be sufficient to recall that according to the general principle of the method each portion is composed of two or more subportions chosen from a larger number of subportions, each of which has been weighed-out in one weighing pan of the machine. From each weighing pan the computer receives an input signal indicative of the weight of the article or articles forming the subportion present in that pan. The computer calculates all possible combinations of the input signals received and chooses that combination which exhibits the smallest difference (with or without regard to the sign of the difference, as the case may be) from the desired or nominal weight of the complete portion. Finally the computer transmits output signals ordering the selected weighing pans, i.e. those belonging to the combination chosen, to open their closure flaps. The subportions thus discharged are collected and packed in any appropriate manner, and as soon as the closure flaps have been reclosed a new weighing cycle can be initiated by supplying articles to the now empty pans. The subportions present in the remaining, non-selected pans are retained therein and the input signals from these pans have been stored in the computer ready for use in the computation etc. of the next weighing cycle.

The number of weighing pans, which can be incorporated in a weighing machine, will however be limited, partly from pure considerations of space and partly by the need for keeping the paths through which the individual subportions are transferred from a weighing pan to a package, reasonably short. The last motive is especially prominent when the weighing pans are arranged in a line side by side, which in itself results in the advantage, compared with an arrangement of the weighing pans in a circle around a central discharge aperture, that when the closure flaps of all selected weighing pans are opened simultaneously, the individual articles or subportions do not arrive simultaneously at the discharge aperture of the weighing machine which consequently is less subject to the risk of being blocked.

SUMMARY OF THE INVENTION

According to the invention there is a provided a weighing pan for weighing-out articles to be packaged batchwise, especially but not exclusively for use in combination weighing of irregularly shaped articles; comprising a front wall, a rear wall and a pair of opposed sidewalls defining between them an article discharge opening, a pivotable closure flap for controlling said article discharge opening, means for pivoting said closure flap between an open and a closed position, and an actuating mechanism for cyclically displacing the opposed sidewalls relative to one another in timed relationship with the pivoting movement of the closure flap from closed to open position and back.

The displaceability of at least one sidewall and the coordination of the displacement of the wall and the pivoting of the closure flap, which characterizes the invention, have the effect that an article within a weighing pan, which might have got jammed between the opposed sidewalls at or after the introduction of the articles into the pan, will be released in connection with the opening of the closure flap so that a complete emptying of the pan is obtained with a high degree of certainty. Consequently it is possible, without adverse effects on the reliability of the weighing process, to provide a combination weighing machine with weighing pans, the width of which, as measured between their opposed sidewalls, is relatively small compared to the maximum dimension of the articles. This in turn leads to the possibility of placing a larger number of weighing pans side by side within a given space, and hence to an increased weighing accuracy due to the greater number of possible combinations, as explained above.

In a preferred embodiment the actuating mechanism is adapted to displace the displaceable sidewall or sidewalls in the proper plane of each wall. The embodiment is expedient because it permits to arrange the weighing pans in a row with minimum interspacing, since the outer width of each pan remains unchanged during the opening and closing of the pan. When the weighing pan is designed such that the closure flap pivots about a horizontal axis and is furthermore rigidly connected with one sidewall, the drive mechanism which anyway is required for the pivoting of the flap, also functions as the actuating mechanism for the displacement of the sidewall.

In addition to a pivotable bottom flap, which in the closed position slopes downwardly towards the front side of the pan, the weighing pan may comprise a front flap which is pivotable about an axis located at its top, and which is substantially vertical in the closed position. With given dimensions of the pan this feature leads to a large cross-sectional area of its discharge opening and a correspondingly fast emptying. The embodiment may be further elaborated by connecting the bottom flap and the front flap rigidly to a respective one of the two opposed sidewalls. This results in a maximum of relative movement between the two sidewalls during the emptying of the pan. For many applications it may, however, be sufficient to provide one movable and one fixed sidewall in each pan.

The invention also relates to a combination weighing machine which is equipped with a plurality of weighing pans of the structure disclosed above, a weighing means associated with each weighing pan, and a computer which, based on input signals received from the weighing means, carries out the combinatorial calculations and delivers output signals for opening the closure flaps of the selected pans. The machine is characterized in that on the basis of the input signals continuously received from the selected pans during their emptying, the computer creates an output signal for closing the closure flap of each of those pans when the input signal received from that pan has become substantially constant, that subsequently the computer computes the difference between the input signal and a stored tare value belonging to the weighing pan in question, and that it delivers an output signal for renewed opening of the closure flap of a weighing pan if, and only if, the computed difference in respect of that pan exceeds a predetermined minimum value.

This arrangement permits to detect the presence, within an "emptied" pan, of a single article, the weight of which exceeds the predetermined minimum value. When that value is properly chosen in relation to the lower limit of the range, within which the weight of the articles can be expected to vary, the certainty for complete emptying of all selected pans increases to nearly 100 percent due to the repeated actuating of the movements of the closure flap and hence also of the displaceable sidewall in case a jammed article should be left in the pan after the flap was first closed. It will be seen that the effect of the renewed opening of the closure flap is dependent on the simultaneous mutual displacement of the two sidewalls and the resulting elimination of the blocking of the jammed article. It may be mentioned as a further technical effect that the closing of the selected pans and hence the initiation of the next combination weighing is accelerated as much as possible with due regard to the condition that it must be impossible to close a pan at a time when there is still an article present in the pivot area of the closure flap.

BRIEF DESCRIPTION OF THE DRAWINGS

The invention will now be described in more detail with reference to the accompanying, somewhat schematic drawings in which.

Figure 4:
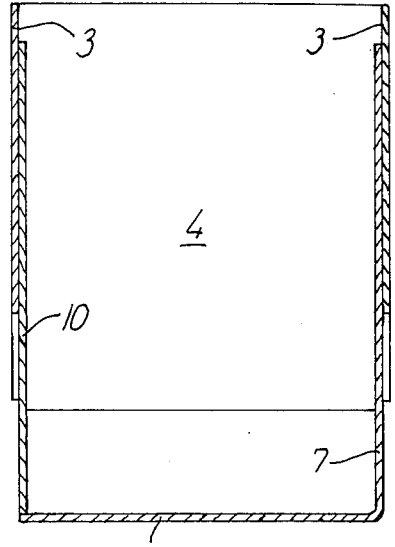
FIG. 4 is a section along line IV—IV of FIG. 1.
Figure 5:
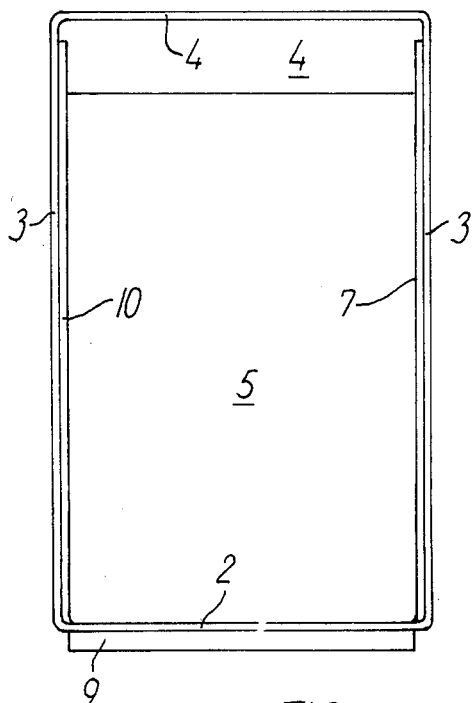
FIG. 5 is a top plan view of the closed weighing pan.

For the sake of clarity the frame of the weighing pan, which serves for mounting the pan in a weighing machine, and the actuating mechanism for the pivotable wall and flap parts of the pan, have been omitted in FIGS. 4 and 5.

DETAILED DESCRIPTION

In the embodiment shown the weighing pan comprises a quadrilateral frame 1 consisting of a vertical front panel 2, two parallel and likewise vertical side panels 3 of broadly trapezoid contour, and a rear panel 4, the lower part of which is deflected in a forwardly and downwardly sloping direction.

A bottom flap 5 is pivotally connected to the lower edge of the just mentioned, deflected part of the rear panel 4 by means of a hinge 6 defining a horizontal pivot axis. Bottom flap 5 is integral with a vertical sidewall 7 located closely inside one side panel 3 of frame 1. In the elevated closing position of unit 5, 7 the bottom flap 5 is located in the extension of the deflected lower part of rear panel 4, and sidewall 7 overlaps substantially the entire adjoining side panel 3.

A front flap 8 is pivotally connected to the lowermost edge of front panel 2 by means of a horizontal hinge 9 and in the closed position the front flap 8 extends vertically downwards in extension of front panel 2, and the lower edge of the flap abuts on the lower edge of bottom flap 5. A sidewall 10 closely spaced from the other side panel 3 of frame 1 on the inner side of that panel is rigidly connected to front flap 8, and as shown in FIG. 1 the wall 10 overlaps substantially the entire area of the associated side panel 3 in its elevated position, similar to the opposed sidewall 7.

Figure 3:
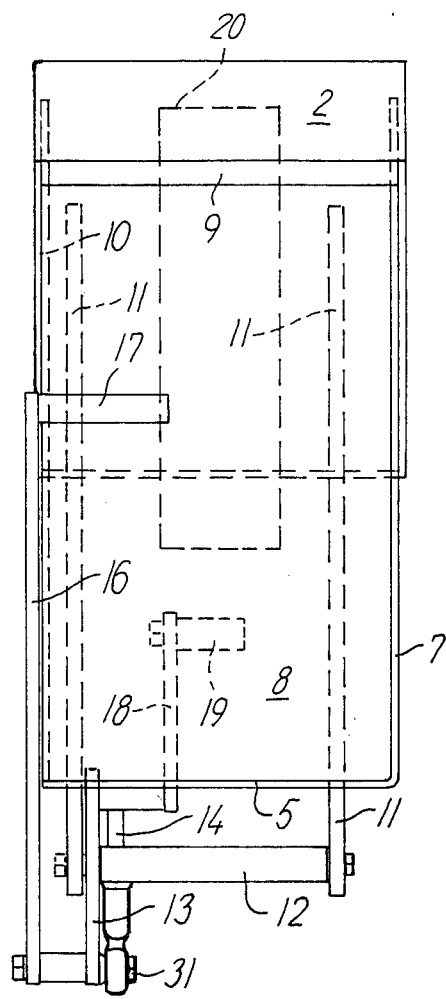
FIG. 3 is a front view of the weighing pan seen in the direction of arrow III in FIG. 1.

Two parallel vertical bars 11 are secured to the rear panel 4 of frame 1, and a transverse shaft 12, see FIG. 3, is journalled between the lower ends of the bars. A rocker arm 13 is secured to shaft 12 midway between its ends, and a pivot pin 31 connects one end of arm 13 to the piston rod 14 of a pneumatic ram 15 which at its upper end is hinged, at 32, to one of bars 11. Through pivot pin 31, the just mentioned one end of rocker arm 13 is also hinged to one end of a link 16, the other end of which is connected to front flap 8 by means of a hinge 17. A second link 18 is connected, in a similar manner, between a pivot pin 33 provided at the opposite end of rocker arm 13 and a hinge 19 secured to bottom flap 5.

Figure 1:
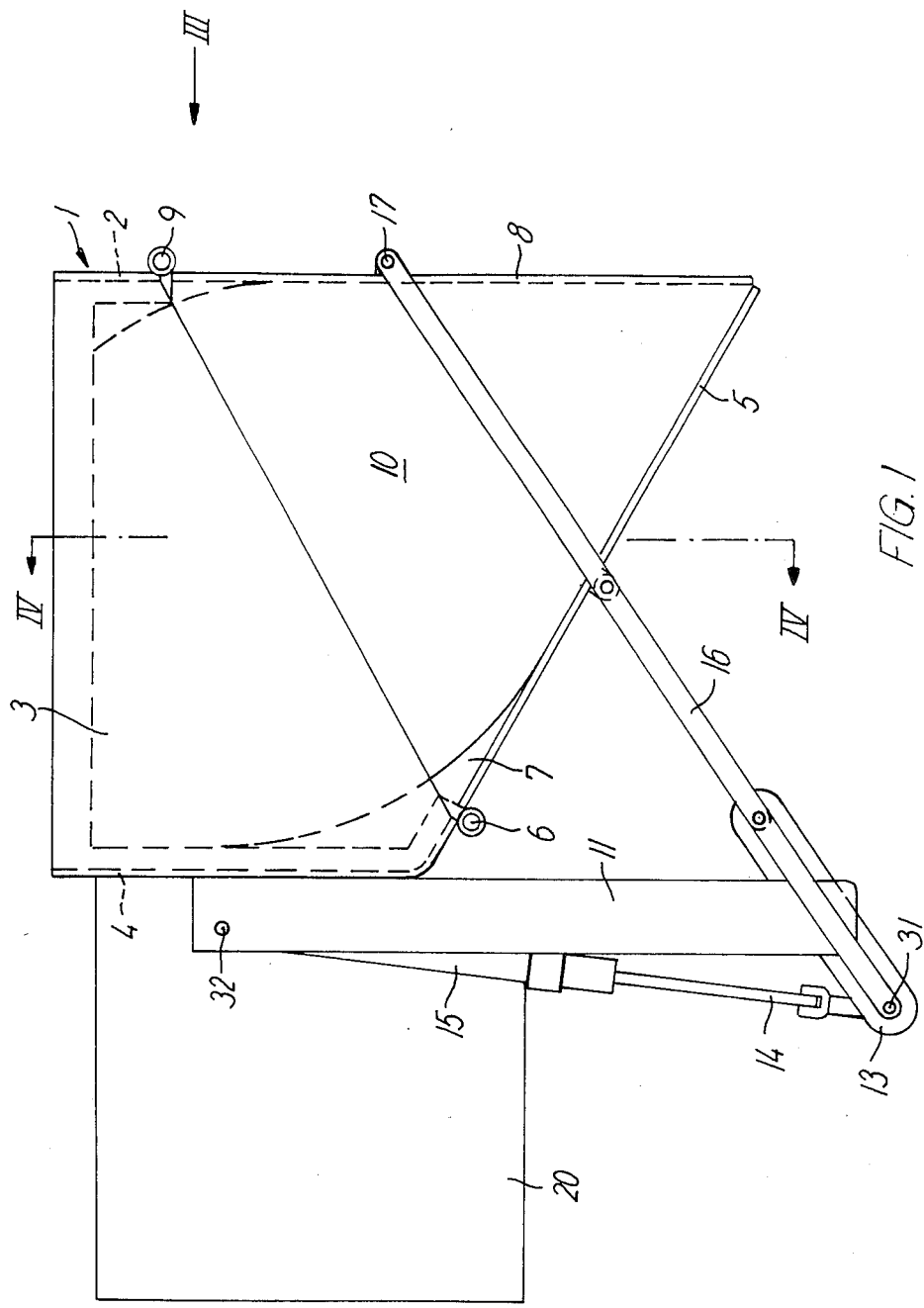
FIG. 1 is an elevation of a weighing pan embodying the invention, with the movable parts of the pan being shown in the closed position.

The linkage 13, 16, 18 may advantageously be designed such that in the closed position of the weighing pan its three members are aligned in a dead centre position, as shown in FIG. 1, or assume positions immediately past such alignment. Then a relatively low air pressure in the relevant working chamber of ram 15 will be sufficient for safely maintaining the pivotal flaps 5 and 8 in their closed positions during loading of the weighing pan. When the pan is to be emptied, pressurized air is supplied to the other working chamber of ram 15, whereby piston rod 14 is retracted and rocker arm 13 with the connected links 16 and 18 and the pivotable components 5, 7 and 8, 10 of the weighing pan are displaced to the positions shown in FIG. 2.

Figure 2:
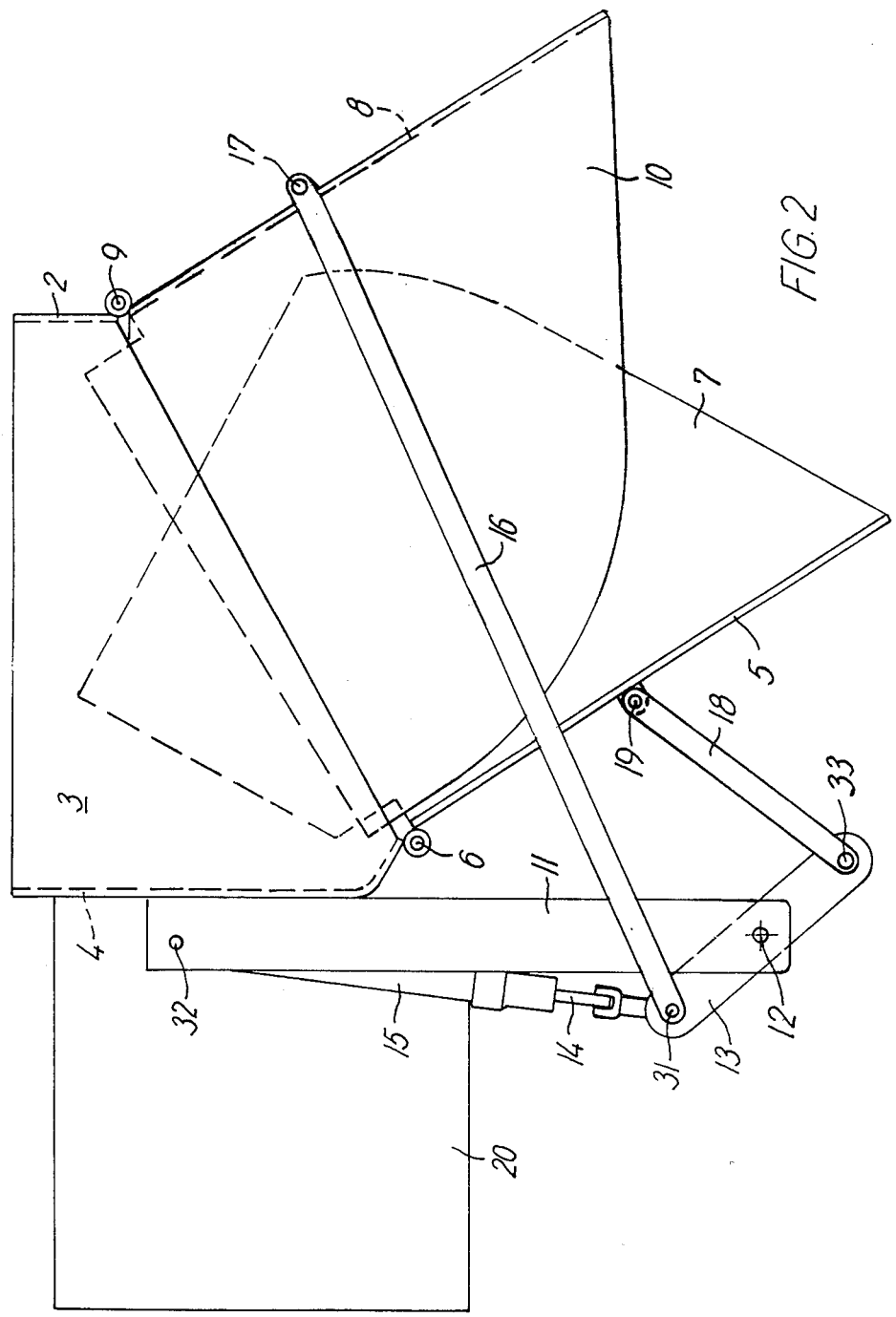
FIG. 2 is a similar elevation of the pan shown in the open or discharge position.

As clearly seen in FIG. 2 the actuation of ram 15 results, not only in the creation of a large discharge opening between flaps 5 and 8, but at the same time in a mutual, oppositely directed pivoting of the opposed sidewalls 7 and 10 about the respective hinges 6 and 9. As a consequence of this relative displacement of the sidewalls in the horizontal as well as in the vertical direction, articles, which during the preceding loading of the weighing pan from above through the open frame 1 might have become jammed between the sidewalls, will be released with practically 100 percent certainty and thus drop out through the bottom outlet of the pan.

Finally, FIGS. 1 to 3 quite schematically show a mounting bracket 20 secured to and protruding rearwardly from rear panel 4. Through bracket 20 the weighing pan may, as well known in the art, be suspended from the frame of a weighing machine with an interposed weighing capsule or other suitable weighing means which, in operation of the machine, detects the weight of the article or articles present in the weighing pan. The earlier mentioned input signals, which in the computer of a combination weighing machine form the basis for the selection of those weighing pans which have to be emptied simultaneously, are provided by the plurality of weighing means. In this context it may be mentioned that it has been found expedient to incorporate a relatively soft resilient suspension, in particular a hydraulic suspension, between the frame of the weighing machine and each weighing pan. This feature reduces the duration of the transient oscillation of the weighing pan following its loading so that the input signal delivered to the computer assumes its correct value relatively soon after the loading step has been terminated.

Figure 6:
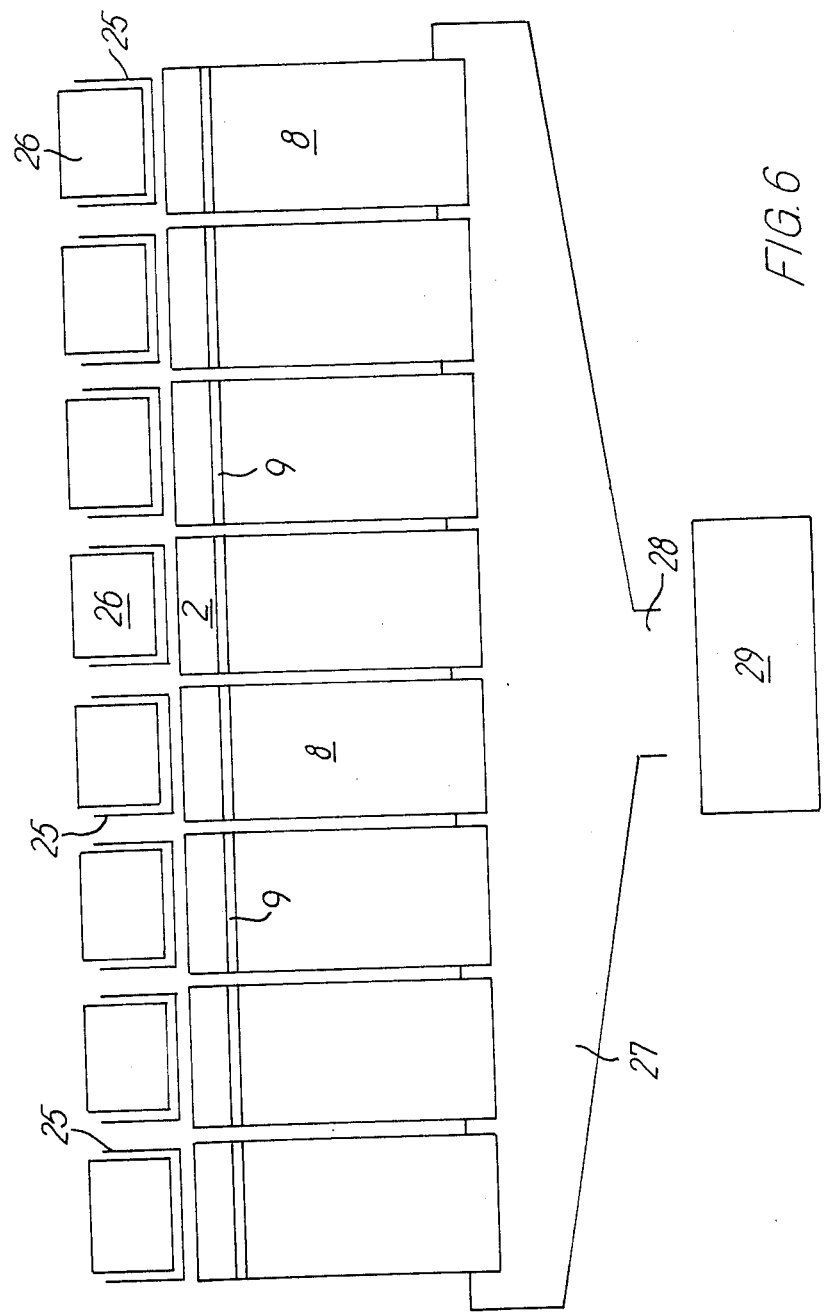
FIG. 6 is a highly schematic view of a weighing machine equipped with eight weighing pans, as illustrated in FIGS. 1-5, located side by side in a row.

FIG. 6 illustrates, very schematically, a possible layout of a combination weighing machine comprising a row of eight weighing pans as described above. Each weighing pan is associated with a separate supply chute 25, the discharge end of which is located above the frame 1 of the weighing pan, and which is equipped with a pivotable closure flap 26 which can obstruct the delivery of articles from the supply chute to the subjacent weighing pan. Each of the eight supply chutes is provided with a separate vibrator mechanism which can be actuated independently of the vibrator mechanisms of the other chutes. Similarly the closure flaps 26 are individually actuatable.

Below the row of weighing pans there is arranged a collector chute 27, the bottom of which is downwardly inclined from each end towards a central discharge opening 28, and below opening 28 there is arranged an (entirely schematically) shown packaging machine 29 for packaging those articles which at each weighing operation are discharged from the selected weighing pans. It is expedient to equip collector chute 27 with a vibrator mechanism, not shown, in order to accelerate the movement of the weighed-out articles towards the packaging machine.

Figure 7:
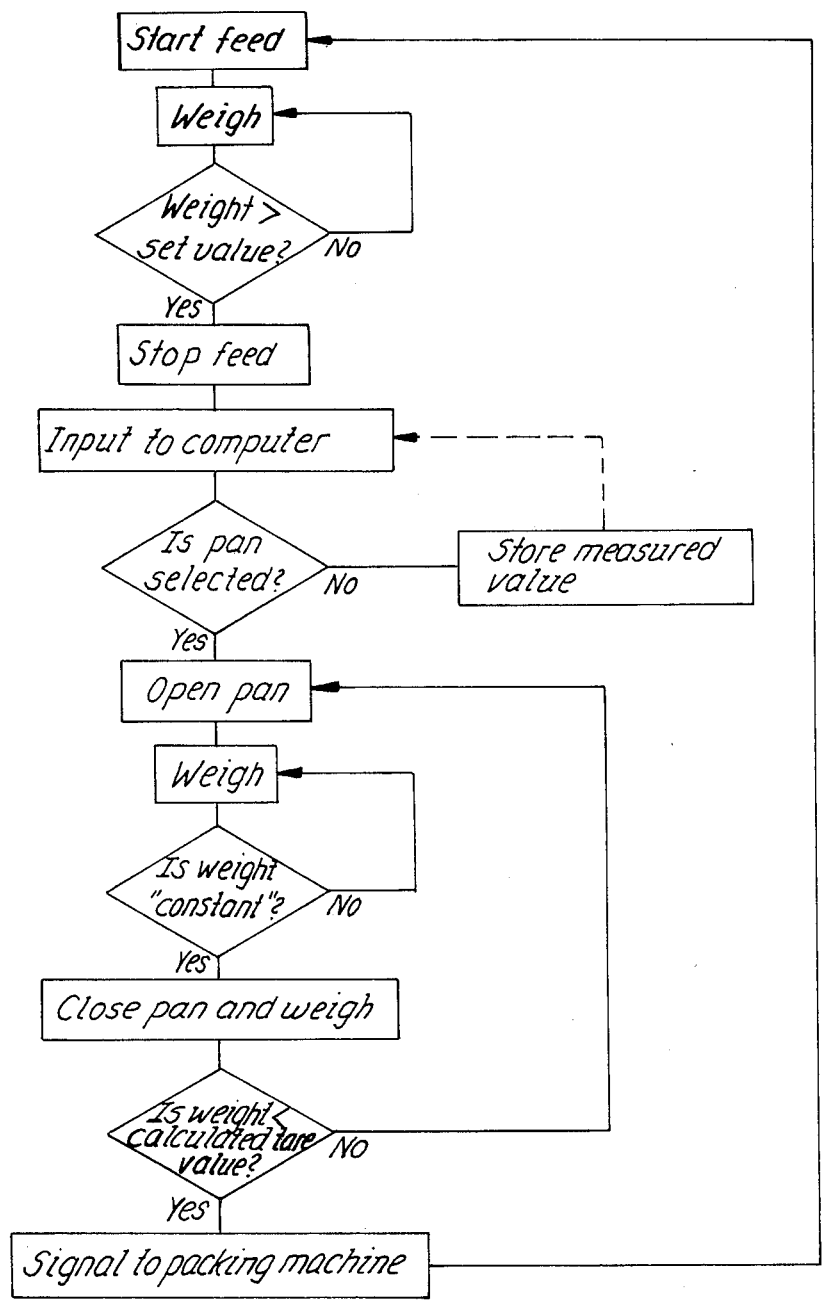
FIG. 7 is a flow chart illustrating the successive steps of a weighing operation carried out in one of the weighing pans of the machine.

Assuming that initially all weighing pans are empty, a metering or weighing-out cycle, as illustrated by the flow chart of FIG. 7, starts by all supply chutes 25 and flaps 26 being actuated to feed articles into the pans. The gross weight of each pan is continuously detected by the associated weighing capsule and transmitted as input signal to the computer. When the signal value exceeds a set value—which may or may not be the same for all pans—flap 26 is closed to interrupt the feed to that pan. As soon as the input signals received from all weighing pans are constant or quasi-constant (disregarding negligible oscillations) the computer calculates the combination of subportions which yields a total weight as close as possible to the required nominal (or minimal) weight of the total portion to be delivered to the packaging machine. The computer then transmits output signals to the rams of those pans which contain said subportions (the selected pans) whereby the pans are opened and their contents discharged into the collector chute extending below the row of weighing pans.

During the emptying of the selected pans, their associated weighing capsules continue to transmit input signals to the computer and when a signal has become constant or quasi-constant (as explained above) the computer transmits an output signal to the actuator ram of the associated pan commanding it to close the pan.

As briefly discussed above, in order to safeguard against the risk of a deficiency in the weight of a portion delivered to the packaging machine, the weight of each selected pan is then compared with a preset value equal to the weight of the pan proper, and if that comparison indicates that one or more articles are wedged or jammed in the pan, a signal to reopen the pan is transmitted from the computer to the associated ram. This action is followed by the same steps as the initial opening of the pan and, except in very rare cases, this results in the jammed article or articles being released and discharged to the packaging machine. It may be advisable to arrange that if the reopening and -closing of the pan should still fail to release a jammed article, then the machine will be shut down and an alarm sounded.

When each of the selected pans has been emptied, a signal may be transmitted to the packaging machine commanding it to initiate, where appropriate with a delay allowing for the travel time of the subportions, the packaging operation. At the same time, signals are transmitted to the supply chutes and closure flaps associated with the selected pans to start the reloading of those pans. The non-selected pan or pans remain closed, and the associated input signal or signals are stored in the computer memory from which they are transferred to the computer's processing unit and processed during the next weighing cycle together with the new input signals received from the weighing pans which were selected and subsequently emptied in the previous cycle.

Since the computer controls not only the weighing machine, including the supply chutes and associated closure flaps of the individual weighing pans, but also the packaging machine, the necessary syncronization of the weighing process and the subsequent packaging is readily ensured. If the computer is programmed to order renewed opening of a weighing pan which was not fully emptied at the first opening, it is particularly important to ensure that the package is not closed before it is certain that the missing fraction of the complete portion has been delivered into the package.

I claim:

1. A weighing pan for weighing-out articles to be packaged batchwise, especially but not exclusively for use in combination weighing of irregularly shaped articles; comprising
    a frame including front and rear walls, a pair of opposed sidewalls defining between them an article discharge opening, at least one of said sidewalls being moveable relative to both of said front and rear walls, at least one
    pivotable closure flap for controlling said article discharge opening,
    means for pivoting said at least one closure flap between an open and a closed position,
    and an actuating mechanism for cyclically displacing the opposed sidewalls relative to one another in timed relationship with the pivoting movement of the closure flap from closed to open position and back.

2. A weighing pan as claimed in claim 1, wherein the cyclical relative displacement of said sidewalls is a movement of at least one sidewall in the proper plane of that wall.

3. A weighing pan as claimed in claim 2, wherein said closure flap is pivotable about a substantially horizontal axis and is rigidly connected to one of the sidewalls.

4. A weighing pan as claimed in claim 1, wherein said closure flap is a pivotable bottom flap, which in its closed position slopes downwardly towards the front side of the pan, and further comprising a front flap hingedly connected at its upper end to the front wall for pivoting about a substantially horizontal axis, and means for pivoting the front flap between a closed position, in which it extends substantially vertically, and an inclined, open position.

5. A weighing pan as claimed in claim 4, wherein the bottom flap is rigidly connected to one of said opposed sidewalls and the front flap is rigidly connected to the opposite sidewall.

6. A combination weighing machine; comprising a plurality of weighing pans as claimed in claim 1, means for intermittently feeding articles into the weighing pans, a weighing means associated with each weighing pan for generating a signal indicative of the weight of said pan, a computer for successively receiving said weight indicative signals from the plurality of weighing means as its input signals, carrying out combinatorial calculations on said input signals received after interruption of the article feed, selecting a set of pans from the possible combinations of pans, and delivering output signals to the pivoting means of the selected pans to open the closure flaps of said selected pans, wherein the computer processes input signals received from the weighing means of the selected pans after the closure flaps thereof have been opened and delivers an output signal to the pivoting means of each selected pan to close the associated closure flap when the input signal from that pan has become substantially constant, that subsequently the computer computes the difference between the substantially constant input signal and a stored tare value belonging to the weighing pan in question, and that it delivers an output signal to the pivoting means of a weighing pan to reopen the closure flap of that pan if, and only if, the computed difference in respect of the pan exceeds a predetermined minimum value.

* * * * *